US011582054B2

(12) United States Patent
Jyoti et al.

(10) Patent No.: US 11,582,054 B2
(45) Date of Patent: Feb. 14, 2023

(54) MULTICAST SOURCE DISCOVERY PROTOCOL (MSDP) LOOP AVOIDANCE

(71) Applicant: Juniper Networks, Inc., Sunnyvale, CA (US)

(72) Inventors: Alisha Jyoti, Bangalore (IN); Vrushank Vipul Upadhyay, Bangalore (IN); Abhishek Chakraborty, Bangalore (IN); Joya Neema, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 46 days.

(21) Appl. No.: 17/247,866

(22) Filed: Dec. 28, 2020

(65) Prior Publication Data

US 2021/0392009 A1 Dec. 16, 2021

(30) Foreign Application Priority Data

Jun. 11, 2020 (IN) .......................... IN202041024555

(51) Int. Cl.
*H04L 12/18* (2006.01)
*H04W 8/00* (2009.01)
(Continued)

(52) U.S. Cl.
CPC ........ *H04L 12/1886* (2013.01); *H04L 12/185* (2013.01); *H04L 45/18* (2013.01); *H04W 4/06* (2013.01); *H04W 8/005* (2013.01)

(58) Field of Classification Search
CPC ... H04L 12/1886; H04L 12/185; H04L 45/18; H04W 4/06; H04W 8/005
See application file for complete search history.

(56) References Cited

U.S. PATENT DOCUMENTS 7,796,593 B1 * 9/2010 Ghosh .................... H04L 45/32
370/395.31
9,838,303 B2 12/2017 Nagarajan et al.
(Continued)

FOREIGN PATENT DOCUMENTS

CN 101232392 A 7/2008
CN 101247210 A 8/2008
(Continued)

OTHER PUBLICATIONS

Extended Search Report from counterpart European Application No. 21163534.7, dated Aug. 27, 2021, 12 pp.
(Continued)

*Primary Examiner* — Min Jung
(74) *Attorney, Agent, or Firm* — Shumaker & Sieffert, P.A.

(57) ABSTRACT

The disclosure describes techniques for enhancements to the Multicast Source Discovery Protocol (MSDP) to reduce Source Active (SA) message loops in one or more multicast domains having overlapping MSDP mesh groups. In some examples, a method includes receiving, by a first MSDP speaker, from a second MSDP speaker, a SA message. The method also includes, when the second MSDP speaker is in a mesh group with the first MSDP speaker, determining whether the first MSDP speaker includes an active SA state corresponding to the SA message. Additionally, the method includes, when the first MSDP speaker does not include the active SA state corresponding to the SA message, accepting the SA message and forwarding the SA message to a third MSDP speaker that is not in the mesh group with the first MSDP speaker and the second MSDP speaker.

20 Claims, 10 Drawing Sheets

(51) Int. Cl.
*H04L 45/18* (2022.01)
*H04W 4/06* (2009.01)

(56) References Cited

U.S. PATENT DOCUMENTS

| | | | | |
|---|---|---|---|---|
| 10,958,564 B1* | 3/2021 | Asthana | ................ | H04L 45/20 |
| 2001/0034793 A1* | 10/2001 | Madruga | ............. | H04L 12/1854 |
| | | | | 709/238 |
| 2005/0185663 A1* | 8/2005 | Lehtonen | ............. | H04L 12/185 |
| | | | | 370/432 |
| 2007/0098003 A1* | 5/2007 | Boers | ................. | H04L 12/1886 |
| | | | | 370/432 |
| 2019/0036717 A1* | 1/2019 | Kebler | ................. | H04L 65/611 |

FOREIGN PATENT DOCUMENTS

| | | |
|---|---|---|
| CN | 101442564 A | 5/2009 |
| CN | 101764812 A | 6/2010 |
| CN | 101924641 A | 12/2010 |

OTHER PUBLICATIONS

Fenner et al. "Multicast Source Discovery Protocol (MSDP) MIB," RFC 4624, Network Working Group, Oct. 2006, 32 pp.

Fenner et al. "Protocol Independent Multicast - Sparse Mode (PIM-SM): Protocol Specification (Revised)," RFC 4601, Network Working Group, Aug. 2006, 112 pp.

Kim et al. "Anycast Rendevous Point (RP) mechanism using Protocol Independent Multicast (PIM) and Multicast Source Discovery Protocol (MSDP)" RFC 3446, Network Working Group, Jan. 2003, 7 pp.

Fenner et al. "Multicast Source Discovery Protocol (MSDP)" RFC 3618, Network Working Group, Oct. 2003, 19 pp.

McBride et al. "Multicast Source Discovery Protocol (MSDP) Deployment Scenarios" RFC 4611, Network Working Group, Aug. 2006, 14 pp.

Response to Communication Pursuant to Rule 69 EPC dated Dec. 12, 2021, from counterpart European Application No. 21163534.7, filed Jun. 15, 2022, 24 pp.

First Office Action and Search Report, and translation thereof, from counterpart Chinese Application No. 202110297546.8 dated Sep. 1, 2022, 8 pp.

\* cited by examiner

11,582,054 B2

MULTICAST SOURCE DISCOVERY PROTOCOL (MSDP) LOOP AVOIDANCE

This application claims the benefit of IN Provisional Application No. 202041024555 filed Jun. 11, 2020, the entire content of which is herein incorporated by reference.

TECHNICAL FIELD

This disclosure relates to computer networks and, more particularly, to discovery of multicast sources over computer networks.

BACKGROUND

A computer network is a collection of interconnected computing devices that exchange data and share resources. In a packet-based network the computing devices communicate data by dividing the data into small blocks called packets. Certain devices within the network, such as routers and switches, maintain routing and/or forwarding information that describe paths through the network. In this way, the packets may be individually transmitted across the network from a source device to a destination device. The destination device extracts the data from the packets and assembles the data into its original form. Dividing the data into packets enables the source device to resend only those individual packets that may be lost during transmission.

Examples of computer networks include enterprise networks, branch networks, service provider networks, home networks, virtual private networks (VPNs), local area network (LANs), virtual LANs (VLANs) and the like. In any case, the computer networks may enable remotely located sources and receivers to share data. In some cases, the computer network may be configured to support multicast traffic, such as Internet Protocol Television (IPTV), desktop conferences, corporate broadcasts, music and video web casts, and other forms of multimedia content. As an example, the computer network may utilize protocol independent multicast (PIM) as a multicast routing protocol to build distribution trees through the computer network for the transmission of multicast traffic from sources to receivers or subscriber devices for particular multicast groups. PIM may operate in several different modes, including Dense Mode (DM), Sparse Mode (SM) in Source-Specific Multicast (SSM) mode or Any Source Multicast (ASM) mode, and Bidirectional (BIDIR) mode.

SUMMARY

In general, the disclosure describes techniques for enhancements to the Multicast Source Discovery Protocol (MSDP) to reduce Source Active (SA) message loops in one or more multicast domains having overlapping MSDP mesh groups. For example, a multicast domain (e.g., a PIM-SM or other PIM domain) may include one or more MSDP speaking routers ("MSDP speakers") arranged into at least two mesh groups for the multicast domain. When a Rendezvous Point router (RP) in a multicast domain first learns of a new sender for a multicast group, e.g., via a PIM register message, the RP constructs a SA message to advertise the sender for the group and sends it to its MSDP peers both within and external to the multicast domain. These MSDP peers flood the SA message to one another. MSDP defines mesh groups as an operational mechanism for reducing SA flooding, typically in an intra-domain setting. When some subset of a multicast domain's MSDP speakers are fully meshed, they can be configured into a mesh group. In general, an MSDP speaker within a mesh group does not forward a SA message that it receives from another member of the mesh group to any other member of the mesh group. More formally, if a member R of a mesh group M receives a SA message from an MSDP peer that is also a member of mesh group M, R accepts the SA message and forwards it to all of its peers that are not part of mesh group M. However, R does not forward the SA message to other members of mesh group M.

Multiple mesh groups within a domain may in some cases overlap in that one or more of the MSDP speakers of the domain are members of multiple mesh groups, which may cause SA message loops in some configurations. MSDP speakers operating according to techniques described herein may apply the following modified mesh group semantic, based in part on tracking SA state information for SA messages, to reduce such SA message loops. First, if a member A of a mesh group receives a SA message from another member B of the mesh group M, the member A determines if it has an active SA state for the multicast source and multicast group indicated in the SA message. If the member A does not have an active SA state, the member A accepts the SA message and forwards it to all of its MSDP peer routers that are not part of mesh group M. If the member A has an active SA state, the member A accepts and forwards the SA message to all of its peers that are not part of mesh group M only when the SA message passes a peer-RPF check that compares the RP address carried in the SA message against the address of the member B from which the message was received. In either case, the member A does not forward the SA message to other members of mesh group M. Second, if a member A of a mesh group M receives an SA message from an MSDP peer that is not a member of mesh group M, the member A forwards the SA message to all members of mesh group M and to any other MSDP peers when the SA message passes the peer-RPF check.

The techniques may provide one or more technical advantages that result in at least one practical application. For example, because conventional MSDP semantics for mesh group operations by MSDP speakers prescribe SA message forwarding by a receiving member A for a mesh group M to all of its MSDP peers that are not in mesh group M, regardless of whether member A already has active SA state for the multicast source and group indicated by the SA message, conventional MSDP semantics may cause SA message loops where two MSPD speakers are members of two separate mesh groups (i.e., the mesh groups overlap). As such, the techniques may reduce SA message loops between the overlapping mesh groups versus conventional MSDP semantics for mesh group operations by MSDP speakers. By reducing SA message loops, the techniques may avoid the CPU spikes and memory consumption caused by repeatedly receiving and processing the same SA messages. As a result, the techniques may improve operation of networks using Protocol Independent Multicast (PIM) Sparse Mode and other multicast networks using MSDP for discovery of active sources of multicast traffic.

An example method includes receiving, by a first Multicast Source Discovery Protocol (MSDP) speaker, from a second MSDP speaker, a source active (SA) message. The method also includes, when the second MSDP speaker is in a mesh group with the first MSDP speaker, determining, by the first MSDP speaker, whether the first MSDP speaker includes an active SA state corresponding to the SA message. Additionally, the method includes, when the first MSDP speaker does not include the active SA state corresponding to the SA message, accepting, by the first MSDP speaker, the SA message and forwarding the SA message to a third MSDP speaker that is not in the mesh group with the first MSDP speaker and the second MSDP speaker.

An example network device operates as first Multicast Source Discovery Protocol (MSDP) speaker. The network device an interface configured to establish an MSDP peer connection with a second MSDP speaker, memory storing a source active (SA) state table, and processing circuitry. The processing circuitry receives a SA message from the second MSDP speaker over the MSDP peer connection. When the second MSDP speaker is in a mesh group with the first MSDP speaker, the processing circuitry determines whether the SA state table includes an active SA state corresponding to the SA message. When the first MSDP speaker does not include the active SA state corresponding to the SA message, the processing circuitry accepts the SA message, and forwards the SA message to a third MSDP speaker that is not in the mesh group with the first MSDP speaker and the second MSDP speaker.

An example computer readable medium comprising instructions that, when executed cause a network device operating as a first Multicast Source Discovery Protocol (MSDP) speaker to receive from a second MSDP speaker, a source active (SA) message. The instructions also cause the network device to, when the second MSDP speaker is in a mesh group with the first MSDP speaker, determine whether the first MSDP speaker includes an active SA state corresponding to the SA message. Additionally, when the first MSDP speaker does not include the active SA state corresponding to the SA message, the instructions cause the network device to accept the SA message and forwarding the SA message to a third MSDP speaker that is not in the mesh group with the first MSDP speaker and the second MSDP speaker.

The details of one or more examples are set forth in the accompanying drawings and the description below. Other features, objects, and advantages will be apparent from the description and drawings, and from the claims.

DETAILED DESCRIPTION

Figure 1:
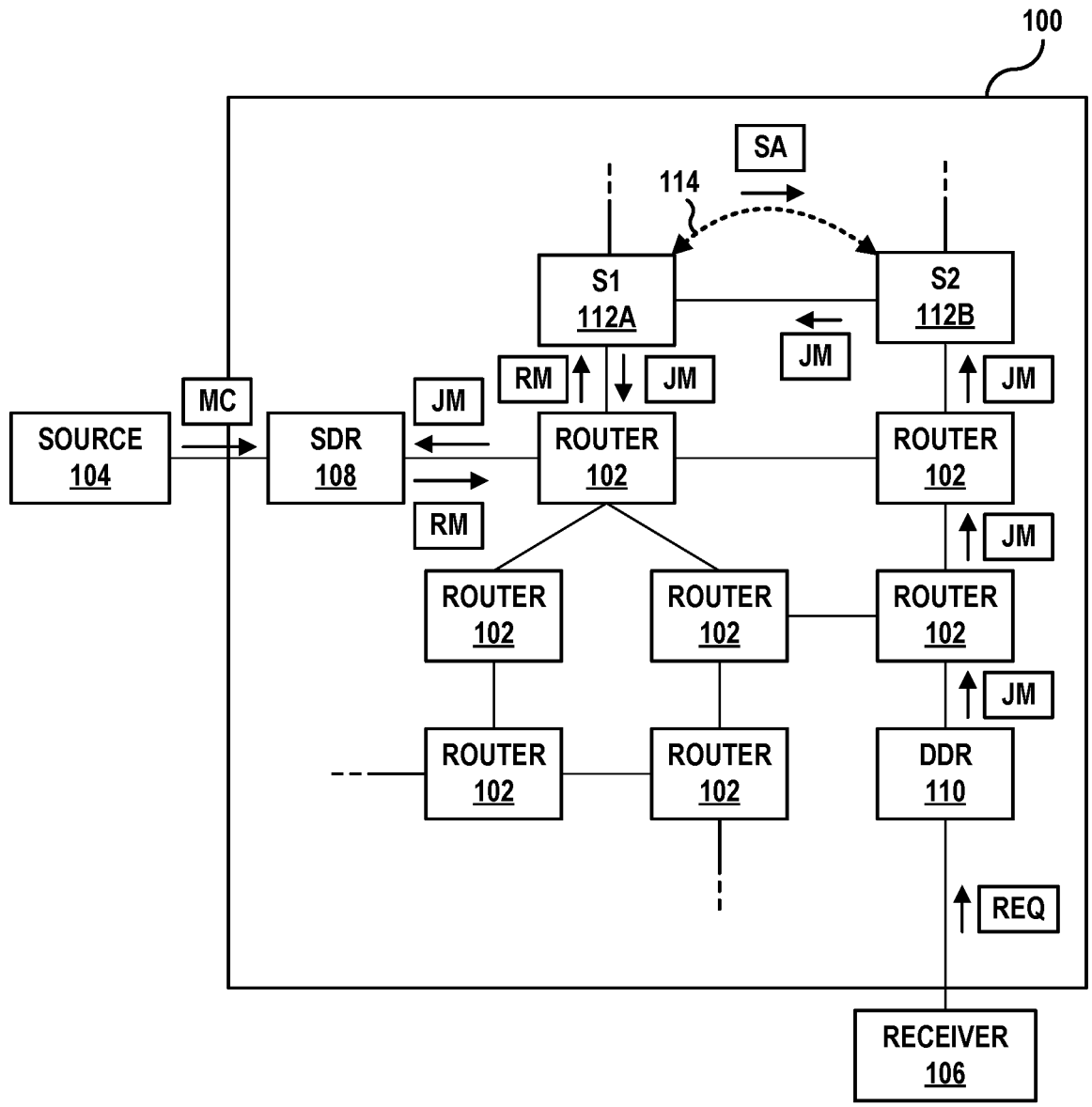
FIG. 1 is a block diagram illustrating an example computer network including routers configured to transmit multicast traffic between a source and a receiver, in accordance with techniques described in this disclosure.

FIG. 1 is a block diagram illustrating an example computer network 100. Network 100 may comprise a private network, a public network, any network, or any combinations thereof. For example, network 100 may include an enterprise network, a campus network, a service provider network, a home network, a local area network (LAN), a virtual local area network (VLAN), virtual private network (VPN), or another autonomous system. In any of these examples, source 104 may transmit data via network 100 and receiver 106 may receive transmitted data via network 100. In an example of network 100 as an enterprise network, each of source 104 and receiver 106 may comprise one or more servers or employee computer terminals located in different regions of a single office location or may comprise a remote office location of a corporation.

In the illustrated example, network 100 comprises an Internet Protocol (IP) network including routing devices that may be configured to use a Protocol Independent Multicast (PIM) protocol, such as the PIM Sparse Mode (SM) protocol ("PIM-SM") to route multicast traffic through network 100 between source 104 and receiver 106 for one or more multicast groups. In the illustrated example, network 100 includes a source designated router (SDR) 108 connected to source 104, a destination designated router (DDR) 110 connected to receiver 104. Network 100 includes plurality of transit routers 102, and one or more routers designated as a MSDP speakers 112A and 112B (collectively referred to as "MSDP speakers 112"). In some cases, either or both of MSDP speakers 112 is a rendezvous point for one or more multicast domains. SDR 102 may be any router to which a source is connected (e.g., the SDR for that source) and the DDR may be any router to which a receiver is connected (e.g., the DDR for that receiver). In some examples, MSDP speakers 112 may be a router that acts exclusively as a rendezvous point. In other examples, an MSDP speakers 112 may have an association with a rendezvous address or otherwise be associated with a rendezvous address. In some examples, such as in a typical network topology that utilizes the PIM-SM protocol, additional transit routers may be included beyond what is shown in FIG. 1. In the illustrated example, MSDP speakers 112 are peers via an MSDP peering connection 114 and provide source discovery within network 100 as described below.

As used herein, the term "connected" may refer to any connection enabling communication between the connected devices. In some examples, the term "connected" may refer to a wired connection. In other examples, the term "connected" may refer to a wireless connection. In other examples, the term "connected" may refer to a wired and wireless connection. In yet other examples, the term "connected" may refer to any form of communicative coupling (e.g., wired, wireless, other a combination thereof). It is also understood that the term "connected" may refer to direct or indirect connections. For example, referring to FIG. 1, source 104 may be considered directly connected to SDR 108, but may be considered to be indirectly connected to any network device downstream of SDR 108. However, it is also understood that FIG. 1 is a simplified example of a network configuration.

Each of source 104 and receiver 106 may be included in a remote site (not shown) that may be a local area network (LAN) or a wide area network (WAN) comprising a plurality of subscriber devices, such as desktop computers, laptops, workstations, PDAs, wireless devices, network-ready appliances, file servers, print servers or other devices. The remote sites may be configured to support multicast traffic, such as Internet Protocol Television (IPTV), desktop conferences, corporate broadcasts, music and video web casts, and other forms of multimedia content.

Source 104 may provide traffic for one or more multicast groups. Receiver 104 may request or subscribe to traffic from one or more multicast groups. While the following is described in terms of the PIM-SM protocol, the disclosed techniques may be used with any appropriate multicast protocol. The PIM-SM protocol operates on a push model. With the PIM-SM protocol, routers do not forward any multicast traffic unless a receiver (e.g., receiver 106) specifically requests (e.g., subscribes to) the traffic. According to the PIM-SM protocol, a MSDP speaker may learn and store source addresses for a certain range of multicast groups provided by source 104 and/or other sources in network 100.

Source 104 may be active and providing multicast traffic ("MC"). Each router 102 that receives multicast traffic from source 104 (e.g., SDR 108) forwards the multicast traffic towards a MSDP speaker. For example, when source 104 starts transmitting multicast traffic, SDR 108 may transmit, directly or indirectly, a first multicast packet encapsulated in a PIM register message ("RM") to a MSDP speaker associated with source 104 (e.g., S1 112A). The MSDP speaker then joins source 104 natively by sending (S,G) PIM Join messages ("JM") for the source 104 and the given multicast group towards source 104 via SDR 108. If no receiver (e.g., receiver 106) has subscribed to the multicast traffic, S1 112A rejects the multicast traffic and send a stop message to SDR 108. This stop message will cause SDR 108 to pause transmitting multicast traffic from source 104 for a threshold period of time (e.g., 30 seconds, 60 seconds, etc.), after which the SDR 108 may again attempt to transmit multicast traffic from source 104.

When receiver 106 is interested in receiving multicast traffic for multicast group G (e.g., an operator of receiver 106 directs receiver 104 to receive multicast traffic for multicast group G, etc.), receiver 106 sends a request (e.g., an Internet Group Management Protocol (IGMP) membership report, etc.) ("REQ") indicating the multicast group G to DDR 110. In the illustrated example, DDR 110 may store the address of S2 112B as the MSDP speaker for receiver 106. DDR 110 initiates establishment of or joining a shared tree by sending (*,G) PIM Join messages for a given multicast group requested by receiver 106. DDR 110 may use its unicast routing table to determine the address of S2 112B. In the illustrated example, DDR 110 sends the PIM Join message towards S2 112B (e.g., by forwarding the PIM join message to intermediate transit router(s) 102, etc.). Similarly, upon receiving the PIM Join message, intermediate transit routers 102 may use unicast routing tables to determine the address of S2 112B to forward the PIM join message. This continues until the PIM join message reaches S2 112B. Upon receipt of the PIM Join message, S2 112B creates a shared tree with S1 112A. S1 112A accepts multicast traffic from source 104 and establishes a root path tree (RPT) (sometimes referred to as a "shared distribution tree"). By virtue of the PIM Join messages, multicast traffic for the given multicast group starts flowing over the shared distribution tree from SDR 108 to DDR 110 and then to receiver 106.

When DDR 106 receives the multicast traffic over the shared distribution tree, DDR 106 discovers a source address for source 104 from the multicast data packet and looks to join source 104 over the shortest path (sometimes referred to as the "Source Path Tree" or "SPT"). To initiate establishment of the shortest path tree, DDR 106 sends out (S,G) PIM Join messages for the source S (source 104) and the multicast group G towards source 104 via intermediate transit router 102 and SDR 108. Upon receiving the (S,G) PIM Join messages, SDR 108 sends the multicast traffic for the given multicast group from source 104 over the shortest path tree as well as the shared distribution tree (e.g., via S1 112A and S2 112B) to DDR 110 and then to receiver 106.

With the multicast traffic being received over both the shared distribution tree and the shortest path tree, DDR 110 sees traffic duplicates. DDR 110 does not forward the multicast traffic received from both the shared distribution tree and the shortest path tree to receiver 104 as this will cause duplicates on the hosts. DDR 110 may, for example, detect the duplicate traffic by way of an incoming interface (IIF) mismatch event (i.e., IIF-MISMATCH) and switch to only receive the multicast traffic for the given multicast group from the shortest path tree. In other words, DDR 110 prunes the multicast traffic for the given multicast group from the shared distribution tree and forwards the multicast traffic for the given multicast group that is received from the shortest path tree. To perform the switch to the shortest path tree, DDR 110 sends (S,G,RPT_Prune) PIM Prune messages on the shared distribution tree towards S2 112B via the intermediate transit routers 102 between DDR 110 and S2 112B to prune the multicast traffic for the given multicast group and the particular source 104 from the shared distribution tree. DDR 1110 may still keep sending (*,G) PIM Join messages towards S2 110B to be able to receive multicast traffic from any other sources sending traffic for the same multicast group. In addition, DDR 110 programs a multicast route in its forwarding engine to have an upstream interface for the multicast route point to the shortest path tree (i.e., to an incoming interface (IIF) associated with the closest intermediate transit router 102 in the shortest path tree). Thus, the multicast traffic for the given multicast group flows only from SDR 108 to DDR 110 over the shortest path tree, and does not flow over the shared distribution tree. Methods to join the shortest path tree without joining the shared distribution tree are described in U.S. Pat. No. 9,838,303, entitled "PIM SOURCE DISCOVERY BY LAST HOP ROUTER," granted Dec. 5, 2017, the contents of which is incorporated by reference in its entirety.

In the illustrated example, network 100 includes multiple MSDP speakers (e.g., S1 112A and S2 112B). Multiple MSDP speakers may be deployed in a single PIM-SM domain (e.g., network 100, etc.). This allows operators of a network (e.g., a multi-regional network, etc.) to distribute MSDP speakers in a topologically significant manner to the sources and receivers in network 100. PIM protocol extensions, such as Anycast RP, define example mechanisms using MSDP to facilitate multiple active MDSP speakers in a single network. Each MSDP speaker participating in an anycast RP set is configured with a consistent set of multicast group-to-speaker address mappings to be used by routers in the network. Each MSDP speaker is configured with the anycast RP address. MSDP peering connections (e.g., unicast connections via the Transmission Control Protocol (TCP)) are established between the MSDP speakers. In the illustrated example, MSDP peering connection 114 is established between S1 112A and S2 112B. Each router 102 is configured with the multicast group-to-speaker mappings. When a MSDP speaker receives a PIM registration message, it may generate and send a Source Active (SA) message to its MSDP peers. For example, when S1 112A receives a PIM registration message from SDR 108, S1 112 may generate and send a SA message to S1 112B over MSDP peering connection 114 to advertise source 104 as a source S for multicast group G. To update the MSDP speaker with available sources within the PIM-SM domain, when an MSDP speaker receives a SA message, the MSDP speaker forwards the SA message to the MSDP peers of the MSDP speaker. In such a manner, the source active information is updated to all MSDP speakers in the network, which may include multiple multicast domains. In some examples, as long as source 104 providing multicast traffic, S1 112A may from time to time re-advertise the available traffic by reissuing the SA message for the multicast group.

When an MSDP speaker (e.g., a rendezvous point for its own domain, etc.) receives a new SA message, it determines if there are any receiver interested in any group described by an (S,G) entry within the SA message. For example, the MSDP speaker checks for a (*,G) entry with a non-empty outgoing interface list, implying that a receiver is interested in the group. The MSDP speaker triggers a (S,G) join event towards the source as if a PIM Join message was received addressed to the MSDP speaker itself. This sets up a branch of the source-tree to this multicast group. Subsequent data packets arrive at the MSDP speaker via this tree branch, and are forwarded down the shared-tree to the receiver. If an MSDP receives a PIM Join message for a new multicast group G, the MSDP speaker may trigger a (S,G) join event for each active (S,G) for that group in its SA cache. Additional information regarding the PIM-SM, MSDP, and Anycast RP may be found in Fenner, B., et al., "Protocol Independent Multicast-Sparse Mode (PIM-SM): Protocol Specification (Revised)," IETF RFC 4601, 2006; Kim D., et al., "Anycast Rendezvous Point (RP) mechanism using Protocol Independent Multicast (PIM) and Multicast Source Discovery Protocol (MSDP)," IETF RFC 3446, 2003; Fenner, B., et al., "Multicast Source Discovery Protocol (MSDP)," IETF RFC 3618, 2003; and McBride, M., et al., "Multicast Source Discovery Protocol (MSDP) Deployment Scenarios," IETF RFC 4611, 2006; the entire contents of each of which are incorporated by reference herein.

MSDP speakers 112 in network 100 may be associated with different ranges of multicast groups provided by source 104 and/or one or more other sources or may be a primary rendezvous point for various routers 102. For example, some routers 102 may send PIM join messages to S1 112A while other routers 102 may send PIM join message to S2 112B. Routers 102 may not learn and store the source addresses for every multicast group offered in network 100, but may only learn the addresses of the corresponding MSDP speaker(s) 112 associated with different ranges of multicast groups. In the illustrated example of FIG. 1, MSDP speakers 112 may know the address of source 104, but routers 102 may only know the address of MSDP speakers 112. In some examples, routers 102 may have a designated MSDP speaker to which it sends PIM join messages when that MSDP speaker is available.

Multicast domains with multiple MSDP speakers forwarding SA messages may cause those SA message to loop between MSDP peers. To help avoid these SA message loops, MSDP speakers 112 may be organized into mesh groups. Because some mesh groups may have overlapping members (e.g., MSDP speakers that are members of multiple mesh groups, etc.), some configurations may still cause SA message loops. These SA message loops can consume network device resources such that packet forwarding may be negatively affected. As described in further detail below, SA message forwarding rules may be implemented by MSDP speakers 112 such that SA message loops may be further reduced in domains with overlapping mesh groups.

In accordance with techniques described in this disclosure, MSDP speakers 112 may apply the following modified mesh group semantic, based in part on tracking SA state information for SA messages, to reduce such SA message loops. First, if a MSDP speaker 112A that is a mesh group M receives a SA message from another member MSDP speaker 112B, of the mesh group M, the member MSDP speaker 112A determines if it has an active SA state for the multicast source and multicast group indicated in the SA message. If the member MSDP speaker 112A does not have an active SA state, the member MSDP speaker 112A accepts the SA message and forwards it to all of its MSDP peer routers that are not part of mesh group M. If the member MSDP speaker 112A has an active SA state, the member MSDP speaker 112A accepts and forwards the SA message to all of its MSDP peers that are not part of mesh group M only when the SA message passes a peer-RPF check that compares the RP address carried in the SA message against the address of the member MSDP speaker 112B from which the message was received. In either case, the member MSDP speaker 112A does not forward the SA message to other members of mesh group M. Second, if a member MSDP speaker 112A of a mesh group M receives an SA message from an MSDP peer that is not a member of mesh group M, the member MSDP speaker 112A forwards the SA message to all members of mesh group M and to any other MSDP peers when the SA message passes the peer-RPF check. In some examples, when MSDP speaker 112A has an active SA state for multicast group G and accepts the SA message (e.g., the SA message passes the peer-RPF check, etc.), MSDP speaker 112A overrides the old SA message (e.g., from MSDP peer X) with the new SA message (e.g., from MSDP peer Y) and marks the old SA message (e.g., from peer X) as overridden. In such a manner, when MSDP speaker 112A receives the old SA message (e.g., from MSDP peer X) as a result of an re-advertisement by the origination MSDP speaker, MSDP speaker 112A will check to see if it matches an overridden SA message and, if so, reject it (e.g., without a further peer-RPF check).

Figure 2:
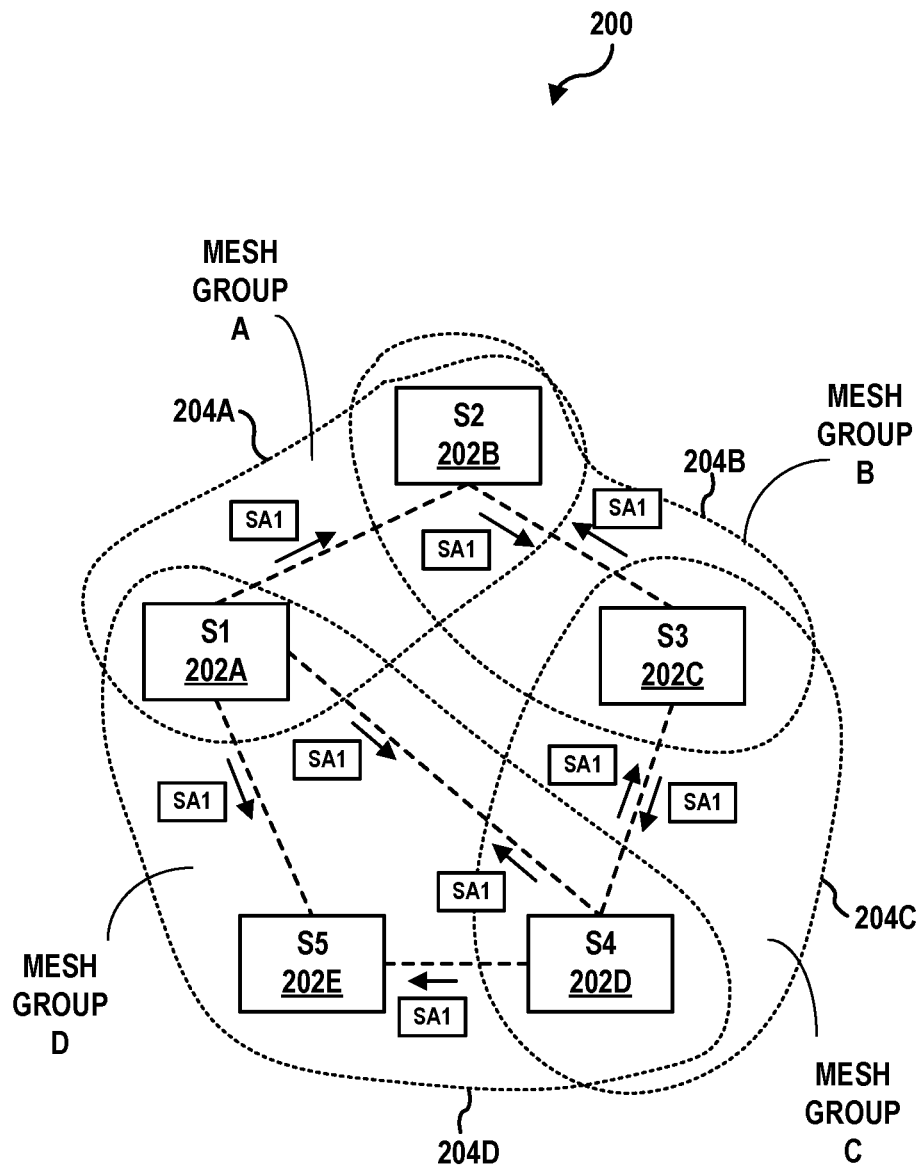
FIG. 2 is a block diagram illustrating example network of domains established according to Protocol Independent Multicast (PIM) Sparse Mode (SM) mode to transmit multicast traffic between a source and a receiver, in accordance with techniques described in this disclosure.

FIG. 2 illustrates MSDP speakers 202A-202E (collectively referred to as "MSDP speakers 202") that are organized into mesh groups 204A-204D (collectively referred to as "mesh groups 204"). MSDP speakers 202 may be examples of MSDP speakers 112 of FIG. 1. For ease of illustration, FIG. 2 does not include a source, a source designated router (SDR), a receiver, a destination designated router (DDR), intermediate transit routers, or unicast connections to connect the network together that may be present in network 100. MSDP speakers 202 establish MSDP peering connections to exchange SA messages regarding sources (e.g., source 104 of FIG. 1) that are active within the corresponding network 100. Traditionally, when an MSDP speakers 202 receives a SA message, it flood the SA message to all of its MSDP peers according to conventional forwarding rules. However, such SA flooding in some network configurations, when performed according to the conventional forwarding rules, may result in flooding loops among MSDP peers. SA flooding along such loops may cause CPU spikes and memory consumption on the routing engine of the MSDP speakers 202 that negatively affects packet forwarding in network 200.

To reduce SA flooding generally, MSPD speakers 202 are arranged into MSDP mesh groups. An MSDP mesh group is a group of MSDP peers with fully meshed MSDP connectivity (e.g., each MSDP speaker in the mesh group is connected to all other MSDP speakers in the mesh group). For example, a network topology may permit some MSDP speakers to be fully meshed, but not all MSDP speakers in the network to be fully meshed. In the illustrated example, S1 202A and S2 202B are configured in mesh group A 204A, S2 202B and 53202C are configured in mesh group B 206B, S3 202C and S4 202D are configured in mesh group C 204C), and S4 202D, S5 202E, and S1 202A are configured in mesh group D 206D. The illustrated example of FIG. 2 includes overlapping mesh groups where one or more MSDP speakers are members of multiple mesh groups. For example, S1 202A is a member of mesh group A 204A and mesh group D 204D.

Conventional MSDP prescribed in RFC 3618, Section 10.2 establishes two rules for SA message forwarding when RP routers are organized in mesh groups. Per the first rule, if a member of a mesh-group receives a SA message from an MSDP peer that is also a member of the mesh-group, (a) the RP router accepts the SA message and forwards it to all of its peers that are not part of the mesh-group, and (b) the RP routers does not forward the SA message to other members of the mesh-group. Per the second rule, if a member of a mesh-group receives an SA message from an MSDP peer that is not a member of the mesh-group, the RP routers forwards the SA message to all members of the mesh-group and to any other MSDP peers when the SA message passes the peer-RPF check. The peer-RPF check compares the address of the MSDP speaker carried in the SA message against the MSDP peer from which the SA message was received. The peer-RPF check uses the address of the originating MSDP speaker determine whether the SA is accepted from a given MSDP peer. A SA message originated by MSDP speaker R and received by MSDP speaker X from MSDP peer N is accepted if N is the peer-RPF neighbor for X, and is discarded otherwise. MP(N,X) is an MSDP peering between N and X. MPP(R,N) is an MSDP peering path (zero or more MSDP peers) between R and N such that, for example, MPP(R,N)=MP(R, A)+MP(A, B)+MP(B, N), etc. SA(S,G,R) is an SA message for source S on group G originated by R. N is the RPF neighbor of X with respect to R if (i) N has an MSDP peering with R, (ii) N is the eBGP next hop of the Peer-RPF route for R, (iii) Peer-RPF route for R is learned through a distance-vector or path-vector routing protocol (e.g., BGP, RIP, DVMRP) and N is the neighbor that advertised the Peer-RPF route for R (e.g., N is the iBGP advertiser of the route for R), or N is the IGP next hop for R if the route for R is learned via a link-state protocol, (iv) N resides in the closest AS in the best path towards R (e.g., if multiple MSDP peers reside in the closest AS, the peer with the highest IP address is the rpf-peer, etc.), or (v) N is configured as the static RPF-peer for R.

However, in domain topologies with overlapping mesh groups, these rules often do not stop SA flooding in loops. Specifically, when an MSDP speaker that is operating according to the two conventional mesh group rules and is a member of a mesh-group receives a SA message from an MSDP peer that is also a member of the mesh-group, the MSDP speaker accepts the SA message and forwards it to all of its peers that are not part of the mesh-group. As a result, the MSDP speaker may forward the SA message to a member of the overlapping mesh-group. For example, if a source sends a PIM Registration message to S1 202A, S1 202A generates a SA message ("SA1") and forwards SA1 to its MSDP peers, RP S2 202B, S4 202D, and S5 202E. S5 202E receives SA1 and does not forward it according to the first conventional rule (S5 202E has no non-mesh group peers). S4 202D forwards SA1 to S3 202C according to the first conventional rule S1 202B forwards SA1 to S3 202C according to the first conventional rule. S3 202C forwards the SA1 according to the first conventional rule. S3 202C forwards SA1 from according to the first conventional rule. S2 202D then forwards SA1 to S1 202A and S5 202E according to the first conventional rule (because S4 202D receives SA1 from a fellow member of mesh group C 204C and forwards SA1 to peers that are not members of mesh group C 204C). S1 202A then acts similarly. Accordingly, SA1 would loop. This loop can cause the CPUs of the MSDP speakers 202 to spike and disrupt multicast packet traffic.

In accordance with techniques described in this disclosure, to reduce the occurrence of loops of SA message in topologies with overlapping mesh groups, MSDP speakers 202 operate according to a first rule that different from the first conventional rule. MSDP speakers 202 store SA state for each multicast group and source 208 (e.g., a SA state for (S,G), etc.) for which it has received a SA message. The SA state for an (S, G) includes an identifier of the MSDP speaker from which the SA message for the (S, G) was last accepted. MSDP speakers 202 apply the following rules to SA messages for mesh group forwarding.

According to a first rule, if a member A of a mesh-group M receives a SA message regarding source S, multicast group G (S, G) from an MSDP peer that is also a member of the mesh-group M, the member A determines if it has an active SA state for (S, G). If member A does not have an active SA state for (S, G), member A accepts the SA message and forwards it to all of its peers that are not part of mesh-group M. If member A has an active SA state for (S, G), member A forwards the SA message to all of its peers that are not part of mesh-group M only when the SA message passes a peer-RPF check (e.g., when A receives the SA message from an peer-RPF neighbor, etc.). In either case, member A does not forward the SA message to other members of mesh group M. When SA message passes a peer-RPF check, member A overrides the previous active SA state with a new active SA message state based on the newly accepted SA message and marks the previous active SA state as overridden. In such examples, if member A subsequently receives a SA message that conforms to an overridden active SA state (e.g., due to a re-advertisement from the originating MSDP speaker, etc.), member A may reject the SA message without performing an additional peer-RPF check.

According to a second rule, if member A of mesh group M receives an SA message for (S, G) from an MSDP peer that is not a member of mesh group M, the member A forwards the SA message to all members of mesh group M and to any other MSDP peers only when the SA message passes the peer-RPF check. In such a manner, the MSDP speakers 202 will not perpetuate a SA loop and can accept SA messages that are indicative of a shorter route between the originating MSDP speaker and the receiving MSDP speaker.

Figure 3:
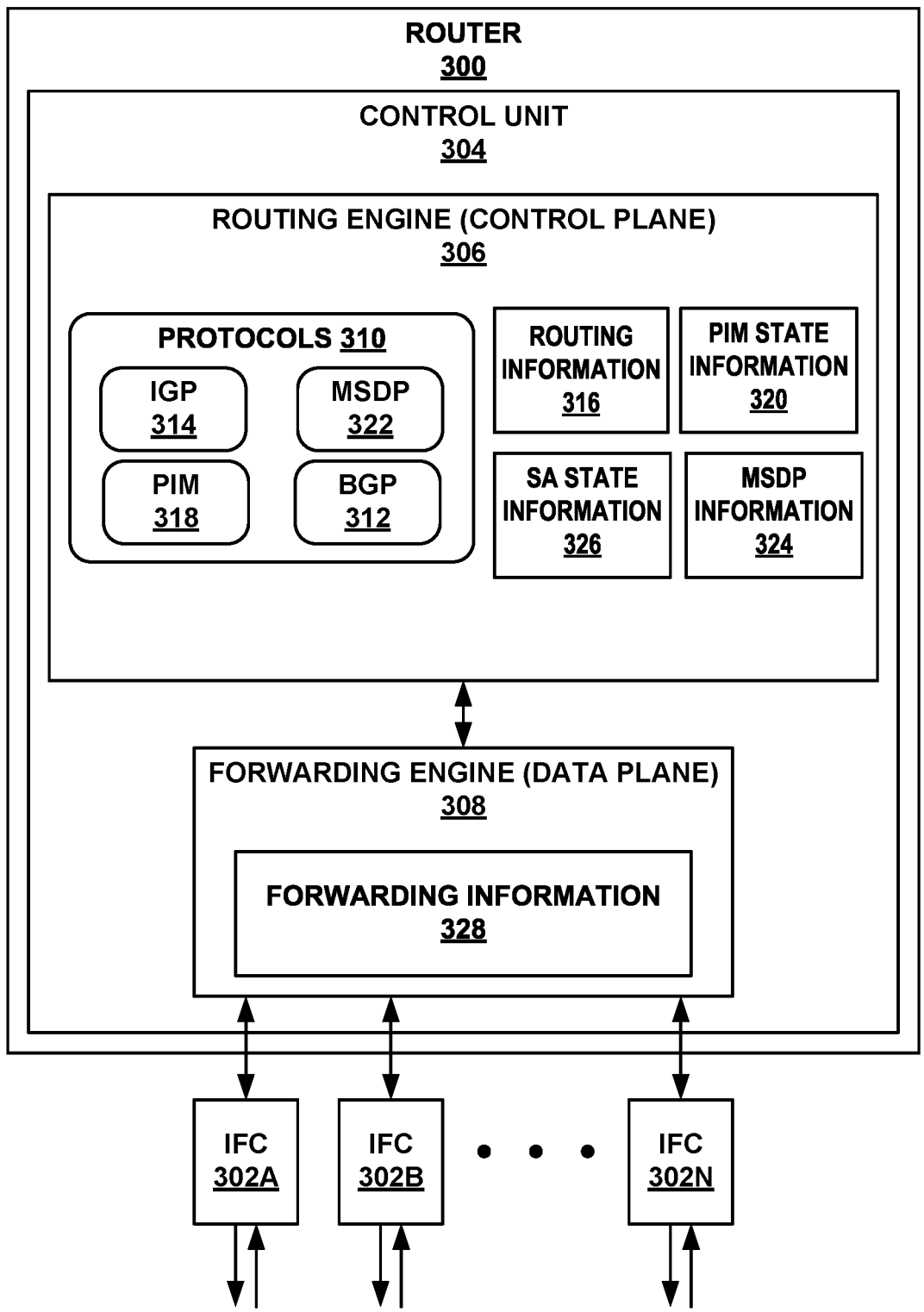
FIG. 3 is a block diagram illustrating an example router, in accordance with techniques described in this disclosure.

FIG. 3 is a block diagram illustrating an example router 300, in accordance with techniques of this disclosure. In one example, router 300 may operate as a rendezvous point (RP) router or a controller router and perform source discovery. For example, router 300 may operate substantially similar to MSDP speakers 112 of FIG. 1 or MSDP speakers 202 of FIG. 2.

In the illustrated example of FIG. 3, router 300 includes interface cards 302A-302N ("IFCs 302") that receive packets via incoming links and multicast packets via outbound links. IFCs 302 are typically coupled to the incoming links and the outbound links via a number of interface ports. Router 300 also includes a control unit 304 that determines routes of received packets and forwards the packets accordingly via IFCs 302.

Control unit 304 includes a routing engine 306 and a forwarding engine 308. Routing engine 306 operates as the control plane for router 300 and includes an operating system that may provide a multi-tasking operating environment for execution of a number of concurrent processes. For example, routing engine 306 provides an operating environment for various protocols 310 that perform routing functions for router 300. In the illustrated example of FIG. 3, routing engine 306 includes a border gateway protocol (BGP) 312 and an interior gateway protocol (IGP) 314 as unicast routing protocols used to exchange routing information with other routing devices in a network in order to discover the network topology and update routing information 316. In the examples described in this disclosure, IGP 314 may be a link-state routing protocol such as open shortest path first (OSPF) or intermediate system-intermedia system (IS-IS). In addition, routing engine 306 includes PIM 318 as a multicast routing protocol used to build multicast distribution trees with the other routing devices in the network using routing information 316 and PIM state information 320. In addition, routing engine 306 includes MSDP 322 as a multicast source discovery protocol to establish unicast peering over, for example, TCP with other routers 300 acting as MSDP speakers.

Routing information 316 may describe the topology of the network in which router 300 resides and may also describe various routes within the network and the appropriate next hops for each route, i.e., the neighboring routing devices along each of the routes. Routing information 316 may include a list of incoming interfaces (IIFs) and a list of outgoing interfaces (OIFs) that indicate which of IFCs 302 are connected to the neighboring routing devices in each route. For example, a given route may comprise a multicast route for multicast traffic for a given multicast group. In that example, the list of IIFs included in routing information 316 for router 300 may include a list of upstream interfaces for all upstream routers that have PIM state for the given multicast group.

MSDP information 324 may describe a current status of link to the peer MSDP routers, RPs for the domain, mesh group relationships, and unicast addresses of the MSDP peers. SA state information 326 (sometimes referred to as an "SA state table") stores a list of (S, G) associations in association with an identifier of the MSDP speaker from which the SA message for the (S, G) was last accepted. MSDP protocol 322, as modified as described in this disclosure, may decide to forward a received SA message based on the SA state information 326.

PIM state information 320 may describe a current status of links to the neighboring routing devices in the multicast distribution trees established using PIM 318. For example, PIM state information 320 may include PIM join states that describe which neighboring routing devices belong to which multicast groups within the range for a given multicast distribution tree. Routing engine 306 analyzes stored routing information 316, PIM state information 320, and MSDP information 324 to generate forwarding information 328 installed in forwarding engine 308.

Forwarding engine 308 provides data plane functionality for router 300. Although not shown in FIG. 3, forwarding engine 308 may comprise a central processing unit (CPU), memory and one or more programmable packet-forwarding application-specific integrated circuits (ASICs). Forwarding information 328 associates network destinations with specific next hops and corresponding ports of IFCs 302.

The architecture of router 300 illustrated in FIG. 3 is shown for exemplary purposes only and should not be limited to this architecture. In other examples, router 300 may be configured in a variety of ways. In one example, some of the functionally of control unit 304 may be distributed within IFCs 302. Control unit 304 may be implemented solely in software, or hardware, or may be implemented as a combination of software, hardware, or firmware. For example, control unit 304 may include one or more processors which execute software instructions. In that case, the various software modules of control unit 304 may comprise executable instructions stored on a computer-readable medium, such as computer memory or hard disk.

Figure 4A:
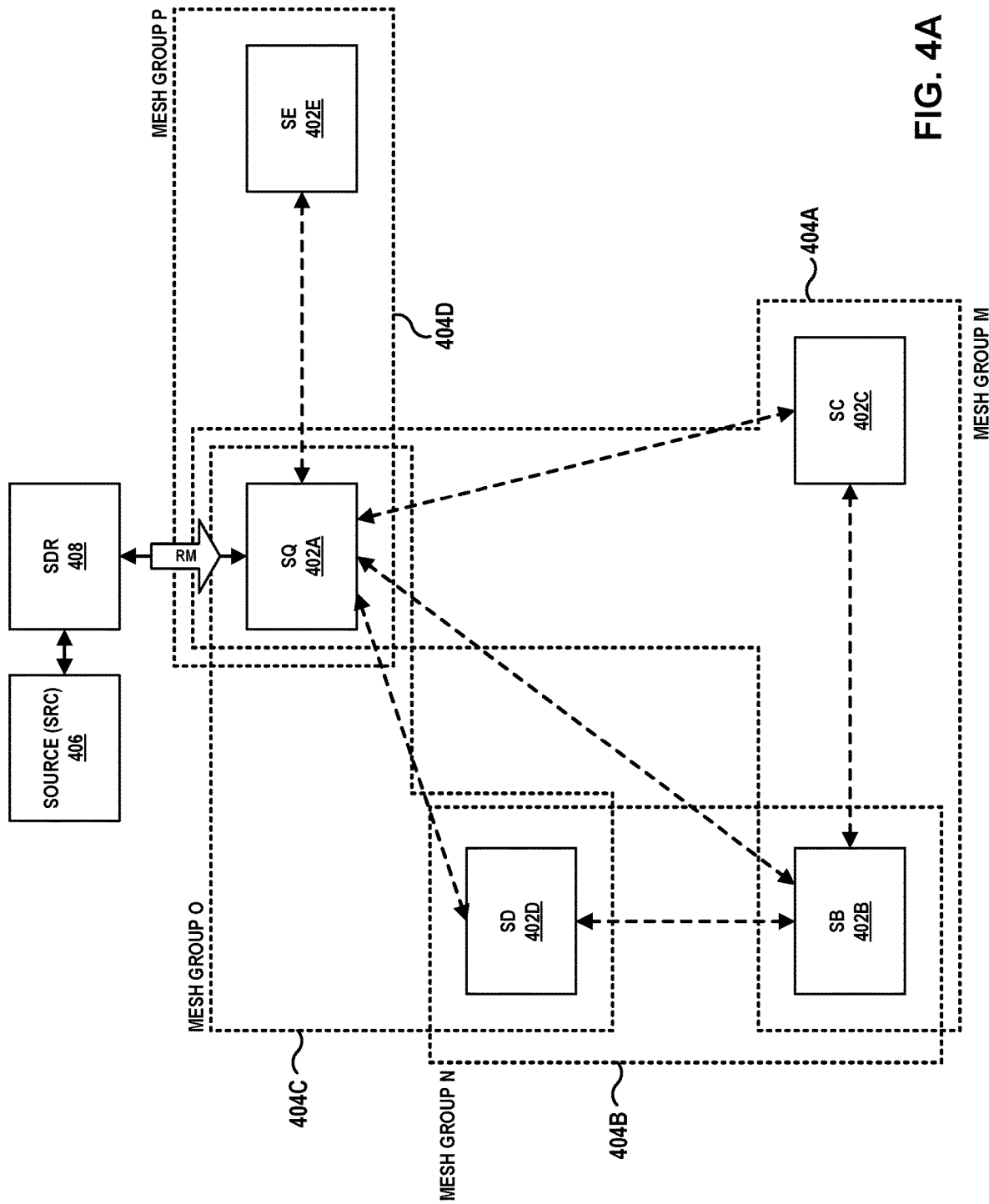
FIGS. 4A-4C are block diagrams illustrating example of network discovery of an active source to avoid source active message loops in overlapping mesh groups in accordance with the techniques of this disclosure.
Figure 4B:
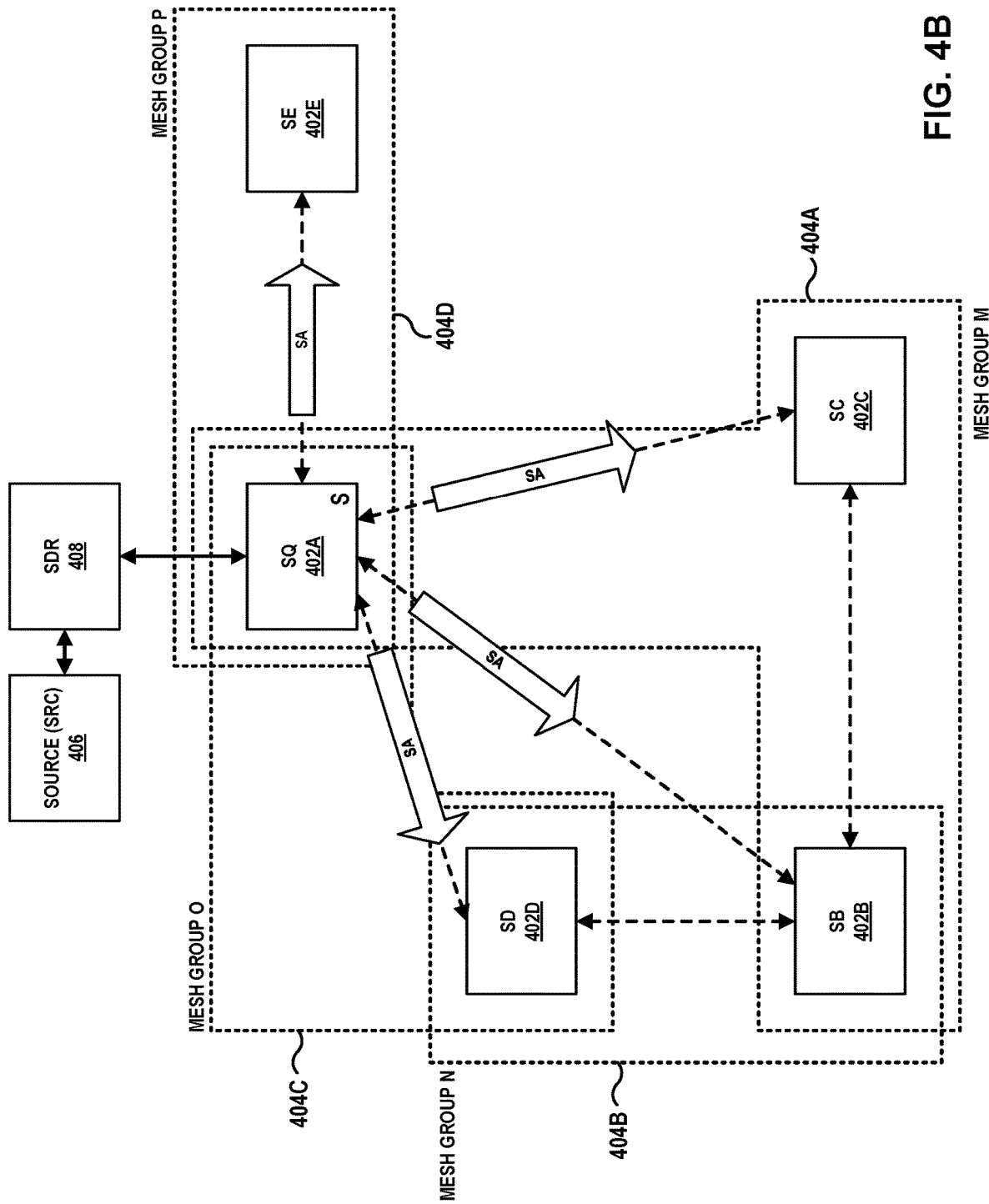
Figure 4C:
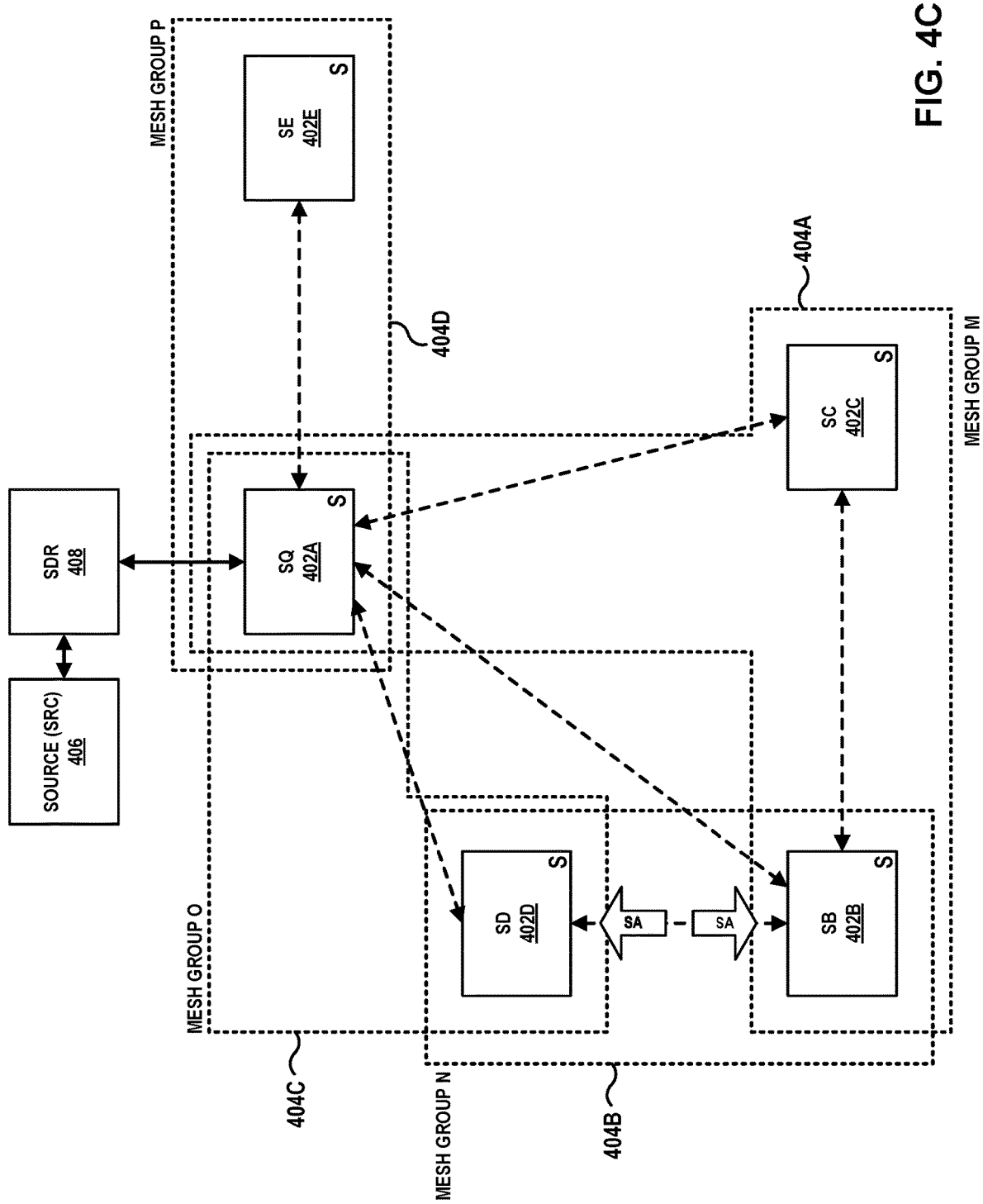

FIGS. 4A-4C are block diagrams illustrating example of network discovery of an active source to avoid source active message loops in overlapping mesh groups in accordance with techniques of this disclosure. MSDP speakers 402A-402E are organized into mesh groups 404A-404D (collectively "mesh groups 404"). Mesh group M 404A includes MSDP speaker 402A ("SQ 402A"), MSDP speaker 402B ("SB 402B"), and MSDP speaker 402C ("SC 402C"). Mesh group N 404B includes SB 402B and MSDP speaker 402D ("SD 302D"). Mesh group O 404C includes SQ 402A and SD 402D. Mesh group P 404D includes SQ 402A and MSDP speaker 402E ("SE 402E"). Mesh groups 404 overlap.

As illustrated in FIG. 4A, source 406 generates multicast traffic for multicast group G. SDR 408 directly or indirectly transmits a PIM registration message to SQ 402A. As illustrated in FIG. 4B, as the originator, SQ 402A transmits a SA message to all of its MSPD peers. Additionally, SQ 402A generates an entry in, for example, in SA state information 326, to record an active SA state for source 406 in association with multicast group G (illustrated in FIGS. 4B and 4C as "S"). As illustrated in FIG. 4C, because SD 402D receives the SA message from an MSDP peer in mesh group O 404C and doesn't have an active SA state when the SA message was received, SD 402D forwards the SA message to SB 402B (e.g., SB 402B is not in mesh group O 404C). Additionally, because SB 402B receives the SA message from an MSDP peer in mesh group M 404A and doesn't have an active SA state when the SA message was received, SD 402D forwards the SA message to SD 402D (e.g., SD 402 D is not in mesh group M 404A). SB 402B, SC 420C, SD 402D and SE 402E each generate an entry in, for example, in SA state information 326, to record an active SA state for source 406 in association with multicast group G. However, for example, because SD 402D has an active SA state for source 406, SD 402D performs a peer-RPF check. This peer-RPF check fails because its active SA state is associated with SQ 402A (i.e., the MSDP speaker from which is received its stored active SA state), which is a shorter path to source 406 than SB 402B. Accordingly, SD 402D does not forward the SA message.

Figure 5A:
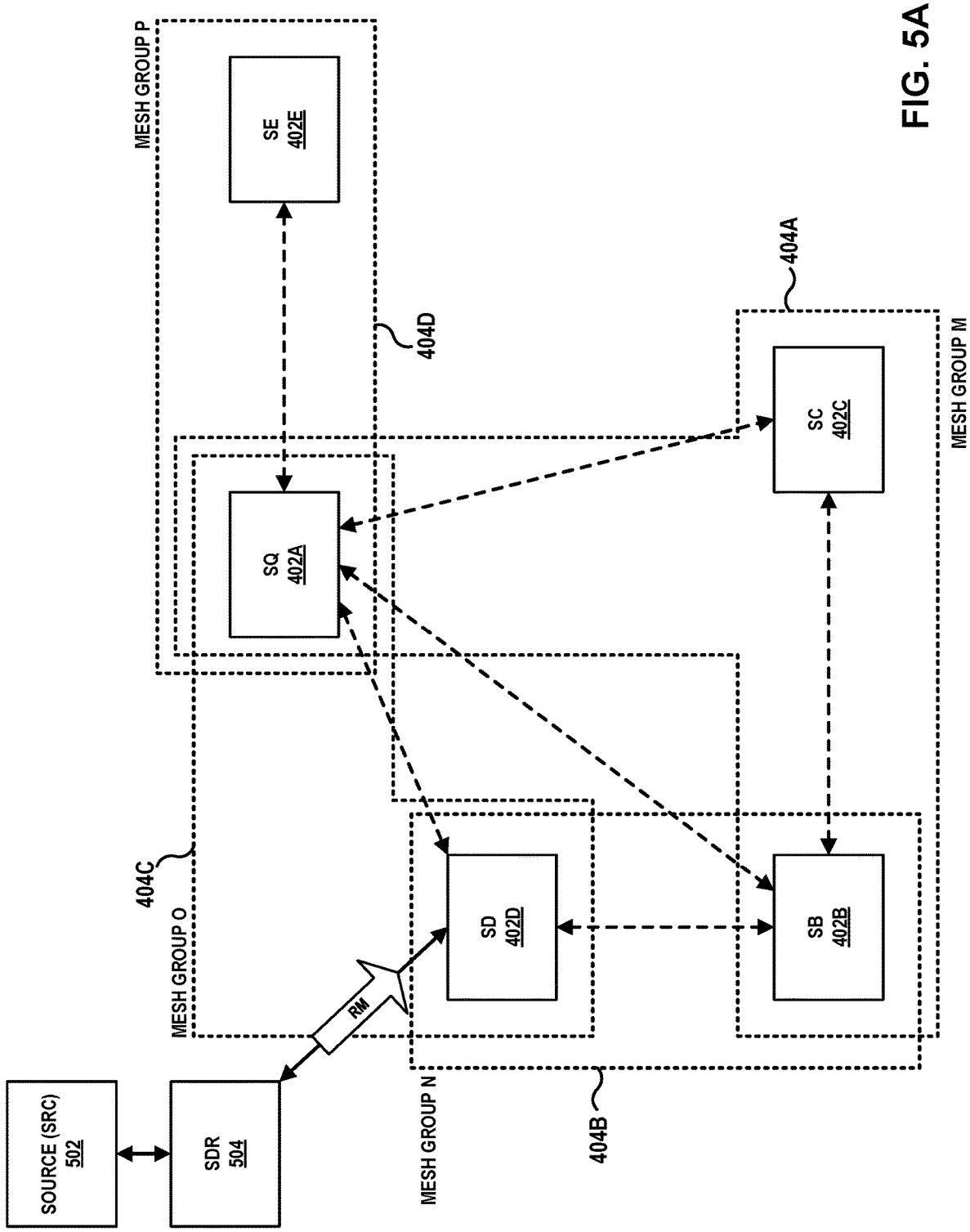
FIGS. 5A-5C are block diagrams illustrating another example of network discovery of an active source to avoid source active message loops in overlapping mesh groups in accordance with the techniques of this disclosure.
Figure 5B:
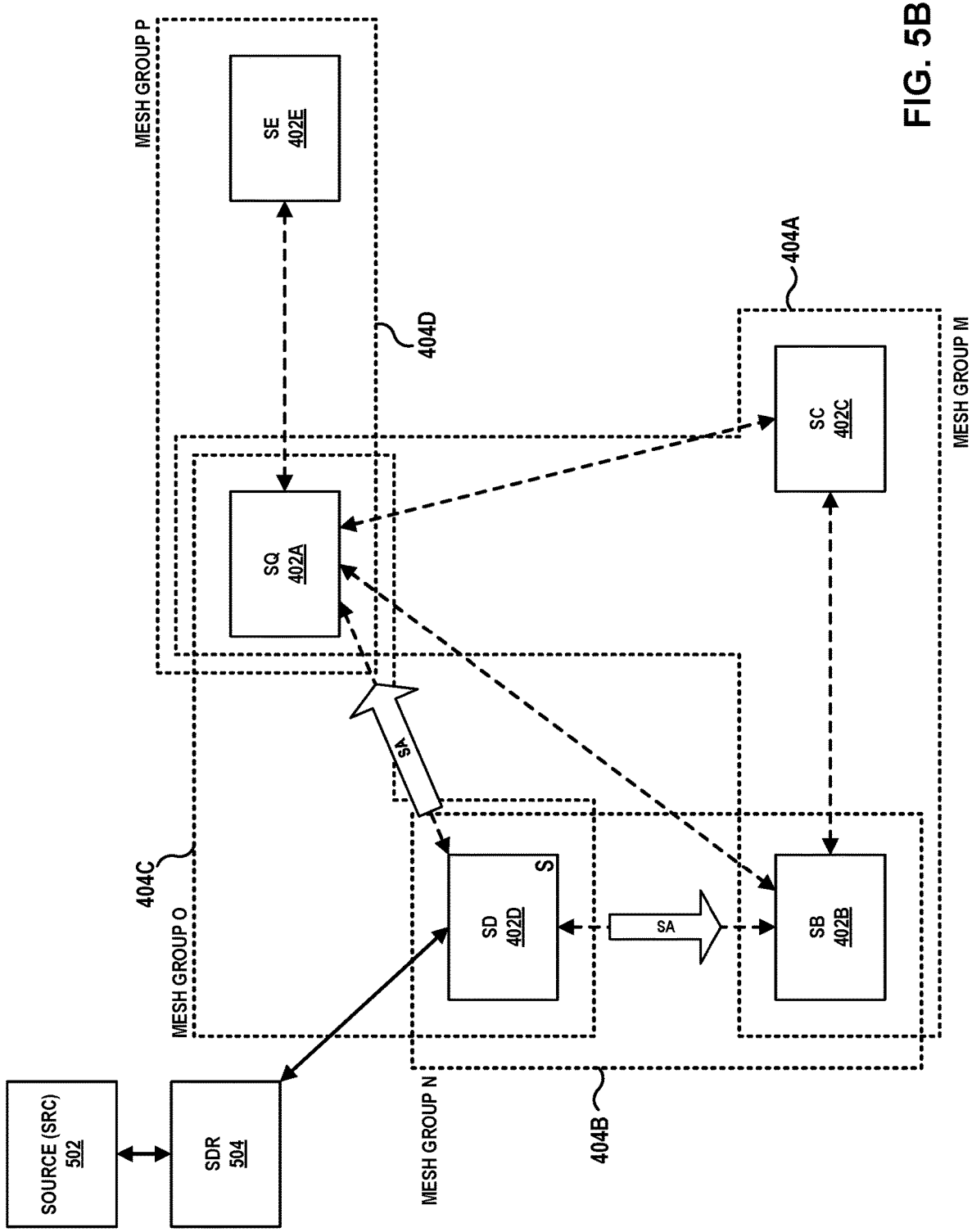
Figure 5C:
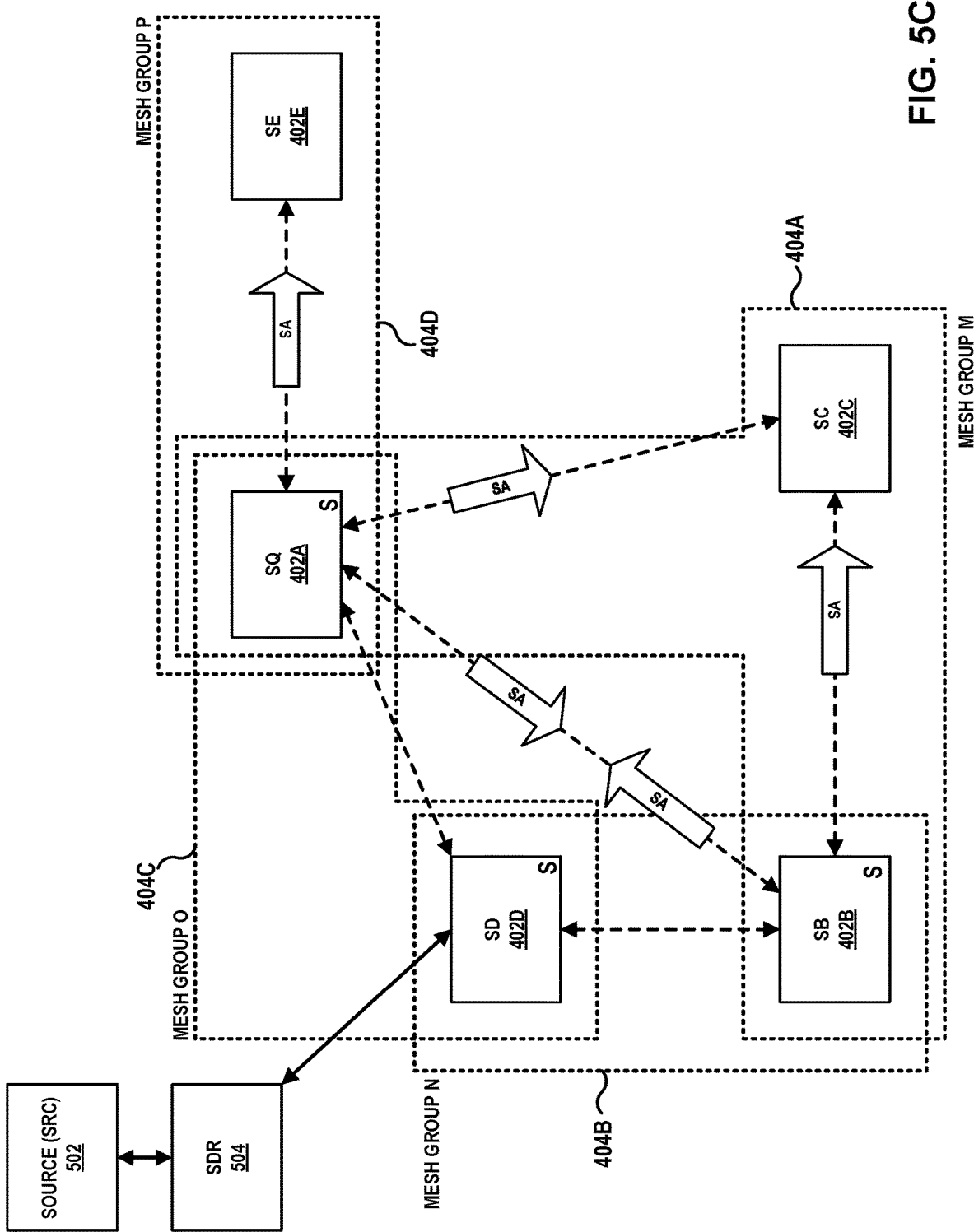

FIGS. 5A-5C are block diagrams illustrating example of network discovery of an active source to avoid source active message loops in overlapping mesh groups, in accordance with techniques of this disclosure. MSDP speakers 402A-402E are organized into mesh groups 404 such that mesh groups 404 overlap. In the illustrate examples, the multicast group for source 502 is coordinated through SD 402D.

As illustrated in FIG. 5A, source 502 generates multicast traffic. SDR 504 directly or indirectly transmits a PIM registration message to SD 402D. As illustrated in FIG. 5B, as the originator, SD 402D transmits a SA message to all of its MSPD peers. Additionally, SD 402D generates an entry in, for example, in SA state information 326, to record an active SA state for source 502 in association with multicast group G (illustrated in FIGS. 5B and 5C as "S"). As illustrated in FIG. 5C, because SB 402B receives the SA message from an MSDP peer in mesh group N 404B and does not have an active SA state for source 502, SB 402B transmits the SA message to its MSDP peers that are not in mesh group N 402B. Similarly, because SQ 402A receives the SA message from an MSDP peer in mesh group O 404C and does not have an active SA state for source 502, SQ 402A transmits the SA message to its MSDP peers that are not in mesh group O 402C. SQ 402A and SB 402B each generate an entry in, for example, in SA state information 326, to record an active SA state for source 502 in association with multicast group G.

Subsequently, SC 402C does not forward the SA message because SC 402C received the SA messages from its MSDP peers and does not have any non-mesh group peers. SQ 402A does not forward the SA message because it has an active SA state for source 502 and peer-RPF-check based on the SA message from SB 402B fails. Similarly, SB 402B does not forward the SA message because it has an active SA state for source 502 and peer-RPF-check based on the SA message from SQ 402A fails. If not for the modified rule of this disclosure, both SQ 402A and SB 402B would have forwarded the SA message to SD 402D, which would have initiated a SA loop that would lead to SA flooding.

Figure 6:
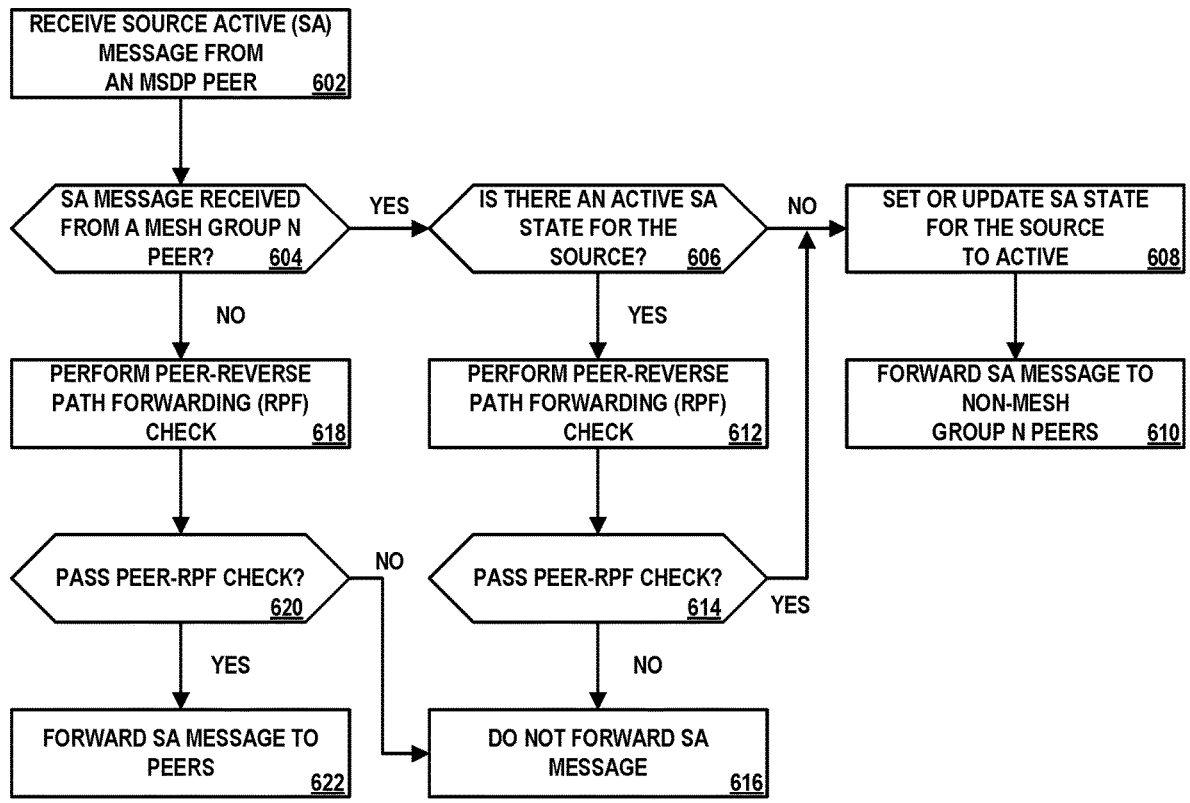
FIG. 6 is a flowchart of an example mode of operation to avoid source active message loops in overlapping mesh groups in accordance with the techniques of this disclosure.

FIG. 6 is a flowchart of an example mode of operation to avoid source active message loops in overlapping mesh groups in accordance with the techniques of this disclosure. Initially, a MSDP speaker (e.g., a MSDP speaker 112 of FIG. 1, a MSDP speaker 202 of FIG. 2, MSDP speaker 300 of FIG. 3, a MSDP speaker 404 of FIGS. 4A-4C and 5A-5C, or other MSDP speaker described herein) receives a SA message from an MSDP peer (602). The MSDP speaker determines whether the SA message was received from an MSDP peer in a mesh group (e.g., "mesh group N") (604).

When the SA message is from a MSDP peer in mesh group N (YES at 604), the MSDP speaker determines whether it has an active SA state for the source associated with the SA message (606). When the MSDP speaker does not have an active SA state for the source (NO at 606), the MSDP speaker sets an active SA state for the source (608). The MSDP speaker then forwards the SA message to MSDP peers not in mesh group N (610). When the MSDP speaker has an active SA state for the source (YES at 606), the MSDP speaker performs an RPF-check (612). When the SA message passes the RPF-check (YES at 614), the MSDP speaker updates the active SA state for the source (608). The MSDP speaker then forwards the SA message to MSDP peers not in mesh group N (610). Otherwise, when the SA message fails the RPF-check (NO at 614), the MSDP speaker does not forward the SA message (616).

When the SA message is not from a MSDP peer in mesh group N (NO at 604), the MSDP speaker performs an RPF-check (618). When the SA message passes the RPF-check (YES at 620), the MSDP speaker forwards the message to its MSDP peers (622). Otherwise, when the SA message fails the RPF-check (NO at 620), the MSDP speaker does not forward the SA message (616).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

The invention claimed is:

1. A method comprising:
receiving, by a first Multicast Source Discovery Protocol (MSDP) speaker, from a second MSDP speaker, a source active (SA) message advertising a multicast source for a multicast group;
when the second MSDP speaker is in a mesh group with the first MSDP speaker, determining, by the first MSDP speaker, whether the first MSDP speaker stores an active SA state for the multicast source and the multicast group indicated in the SA message; and
when the first MSDP speaker does not store the active SA state for the multicast source and the multicast group indicated in the SA message, accepting, by the first MSDP speaker, the SA message and forwarding the SA message to a third MSDP speaker that is not in the mesh group with the first MSDP speaker and the second MSDP speaker.

2. The method of claim 1, further comprising, when the first MSDP speaker does not store the active SA state for the multicast source and the multicast group indicated in the SA message, generating, by the first MSDP speaker, the active SA state for the multicast source and the multicast group indicated in the SA message.

3. The method of claim 1, further comprising:
when the first MSDP speaker stores the active SA state for the multicast source and the multicast group indicated in the SA message, performing a peer-Reverse Path Forwarding (RPF) check on the SA message; and
when the SA message fails the peer-RPF check, rejecting the SA message.

4. The method of claim 1, further comprising:
when the first MSDP speaker stores the active SA state for the multicast source and the multicast group indicated in the SA message, performing a peer-Reverse Path Forwarding (RPF) check on the SA message; and when the SA message passes the peer-RPF check, accepting the SA message and forwarding the SA message to the third MSDP speaker that is not in the mesh group with the first MSDP speaker.

5. The method of claim 4, further comprising when the SA message passes the peer-RPF check, updating the active SA state based on the SA message to create an association with the second MSDP speaker.

6. The method of claim 4, wherein the active SA state is a first active SA state associated with a third MSDP speaker, and further comprising when the SA message passes the peer-RPF check:

overriding the first active SA state with a second active SA state for the multicast source and the multicast group indicated in the SA message to create an association with the second MSDP speaker;

marking the first active SA state as overridden; and in response to receiving a subsequent SA message from the third MSDP speaker, the subsequent SA message advertising the multicast source for the multicast group indicated in the first active SA state, rejecting the subsequent SA message without performing another peer-RPF check.

7. The method of claim 1, further comprising:

when the second MSDP speaker is not in the mesh group with the first MSDP speaker, performing a peer-Reverse Path Forwarding (RPF) check on the SA message; and when the SA message fails the peer-RPF check, rejecting the SA message.

8. The method of claim 1, further comprising:

when the second MSDP speaker is not in the first mesh group with the first MSDP speaker, performing a peer-Reverse Path Forwarding (RPF) check on the SA message; and when the SA message passes the peer-RPF check, forwarding the SA message to a fourth MSDP speaker that is in the mesh group.

9. The method of claim 1, further comprising:

before determining whether the first MSDP speaker stores the active SA state for the multicast source and the multicast group indicated in the SA message, determining whether the second MSDP speaker is in the mesh group with the first MSDP speaker.

10. The method of claim 1, further comprising:

when the second MSDP speaker is not in a mesh group with the first MSDP speaker, eschewing determining whether the first MSDP speaker stores the active SA state for the multicast source and the multicast group indicated in the SA message; and performing a peer-Reverse Path Forwarding (RPF) check on the SA message.

11. The method of claim 1, wherein the first and second MSDP speakers are rendezvous points for a single multicast domain.

12. The method of claim 1, wherein first MSDP speaker is a rendezvous point for a first multicast domain and second MSDP speaker is a rendezvous point for a second multicast domain.

13. A network device operating as first Multicast Source Discovery Protocol (MSDP) speaker, the network device comprising:

an interface configured to establish an MSDP peer connection with a second MSDP speaker;

memory storing a source active (SA) state table; and processing circuitry configured to:

receive a SA message from the second MSDP speaker over the MSDP peer connection, the SA message advertising a multicast source for a multicast group;

when the second MSDP speaker is in a mesh group with the first MSDP speaker, determine whether the SA state table stores an active SA state for the multicast source and the multicast group indicated in the SA message; and when the SA state table does not store the active SA state for the multicast source and the multicast group indicated in the SA message:

accept the SA message, and forward the SA message to a third MSDP speaker that is not in the mesh group with the first MSDP speaker and the second MSDP speaker.

14. The network device of claim 13, wherein when the SA state table does not store the active SA state for the multicast source and the multicast group indicated in the SA message, the processing circuitry is further configured to generate and store the active SA state for the multicast source and the multicast group indicated in the SA message in the SA state table.

15. The network device of claim 13, wherein the processing circuitry is configured to:

when the SA table stores the active SA state for the multicast source and the multicast group indicated in the SA message, perform a peer-Reverse Path Forwarding (RPF) check on the SA message; and when the SA message fails the peer-RPF check, reject the SA message.

16. The network device of claim 13, wherein the processing circuitry is configured to:

when the SA state table stores the active SA state for the multicast source and the multicast group indicated in the SA message, perform a peer-Reverse Path Forwarding (RPF) check on the SA message; and when the SA message passes the peer-RPF check:

accept the SA message, update the active SA state in the SA state table based on the SA message, and forwarding the SA message to the third MSDP speaker that is not in the mesh group with the first MSDP speaker.

17. The network device of claim 13, wherein the processing circuitry is configured to:

when the second MSDP speaker is not in the mesh group, performing a peer-Reverse Path Forwarding (RPF) check on the SA message; and when the SA message fails the peer-RPF check, rejecting the SA message.

18. The network device of claim 13, wherein the processing circuitry is configured to:

when the second MSDP speaker is not in the first mesh group, performing a peer-Reverse Path Forwarding (RPF) check on the SA message; and when the SA message passes the peer-RPF check, forwarding the SA message to a fourth MSDP speaker that is in the mesh group.

19. The network device of claim 13, wherein the processing circuitry is configured to, before determining whether the first MSDP speaker stores the active SA state for the multicast source and the multicast group indicated in the SA message, determine whether the second MSDP speaker is in the mesh group with the first MSDP speaker.

20. A non-transitory computer readable medium comprising instructions that, when executed, cause a network device operating as a first Multicast Source Discovery Protocol (MSDP) speaker to:
- receive from a second MSDP speaker, a source active (SA) message advertising a multicast source for a multicast group;
- when the second MSDP speaker is in a mesh group with the first MSDP speaker, determine whether the first MSDP speaker stores an active SA state for the multicast source and the multicast group indicated in the SA message; and
- when the first MSDP speaker does not store the active SA state for the multicast source and the multicast group indicated in the SA message, accept the SA message and forwarding the SA message to a third MSDP speaker that is not in the mesh group with the first MSDP speaker and the second MSDP speaker.

* * * * *